(12) United States Patent
Ngo et al.

(10) Patent No.: US 6,394,397 B1
(45) Date of Patent: May 28, 2002

(54) LIFTING SURFACE WITH ACTIVE VARIABLE TIP MEMBER AND METHOD FOR INFLUENCING LIFTING SURFACE BEHAVIOR THEREWITH

(75) Inventors: Hieu T. Ngo, Gilbert; Lisa E. Barlow, Peoria, both of AZ (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/730,702

(22) Filed: Dec. 6, 2000

(51) Int. Cl.[7] .................................................. B64C 23/00

(52) U.S. Cl. ...................... 244/199; 244/198; 244/201; 244/203

(58) Field of Search .................................. 244/1 N, 198, 244/199, 201, 203

(56) References Cited

U.S. PATENT DOCUMENTS

| 4,017,041 A | * | 4/1977 | Nelson ...................... 244/40 R |
| 4,247,063 A | * | 1/1981 | Jenkins ......................... 244/91 |
| 4,429,844 A | | 2/1984 | Brown et al. |

(List continued on next page.)

OTHER PUBLICATIONS

American Helicopter Society, Inc., Mach–Scale Design of a Rotor–Model with Active Blade Tips, May 25–27 1999, pp. 579–598, American Helicopter Society, Inc., Montreal, Canada.

Deutsche Gesellschaft Fur Luft—Und Raumfahrt E.V. (DGLR), The Influence of Winglets on Rotor Aerodynamics, Sep. 22–25, 1986, pp. 1029–1044, Garmisch–Partenkirchen, Federal Republic of Germany.

American Helicopter Society, Inc., Alterations of the Tip Vortex Structure from a Hovering Rotor using Passive Tip Devices, Apr. 29—May 1, 1997, pp. 755–774, American Helicopter Society, Inc., Virginia Beach, Virgina.

Special Vortices at a Helicopter Rotor Blade, pp. 16–22.

Mullins, Jr.; Smith; Rath; and Thomas, Helicopter Rotor Tip Shapes for Reduced Blade–Vortex Interaction—An Experimental Investigation, Part II, 1995, pp. 1–10, The American Institute of Aeronautics and Astronautics, Inc.

Tung; and Russell, Modifications of the Tip Vortex Structure from a Hovering Rotor using Spollers.

Snowflake 2001 NRTC/Rita Project (The Flip Tip–A–Novel Method for Reducing Blade/Vortex Interaction Noise and Improving Hover Efficiency), pp. 1–2.

*Primary Examiner*—Michael J. Carone
*Assistant Examiner*—Gabriel S Sukman
(74) *Attorney, Agent, or Firm*—Alston & Bird LLP

(57) ABSTRACT

A tip member is movable mount at the outboard end of a main lifting member such as a wing or rotor blade. The main lifting member at least at the outboard end has an internal cavity defined therein between pressure-side and suction-side surfaces of the main lifting member. The tip member is movable relative to the main lifting member between a neutral position in which the tip member presents substantially no obstacle to a spanwise component of flow over either suction-side or pressure-side surfaces at the outboard end of the main lifting member, and a position in which a portion of the tip member extends beyond on of the pressure-side and suction-side surfaces of the main lifting member so as to present an obstacle to the spanwise component of flow over that surface at the outboard end of the main lifting member and thereby locally affect the flow at the outboard end. An actuation system for the tip member is disposed in the cavity of the main lifting member and coupled with the tip member for moving the tip member so as to vary a distance by which the tip member extends beyond the surface of the main lifting member. The tip member can be placed in stationary positions, or can be cyclically moved for achieving various effects such a vibration abatement, noise suppression, or lift augmentation.

25 Claims, 3 Drawing Sheets

U.S. PATENT DOCUMENTS

| | | |
|---|---|---|
| 4,477,042 A | 10/1984 | Griswold, II |
| 4,598,885 A * | 7/1986 | Waitzman .................... 244/13 |
| 4,722,499 A * | 2/1988 | Klug ......................... 244/199 |
| 5,102,068 A | 4/1992 | Gratzer |
| 5,156,358 A * | 10/1992 | Gerhardt ..................... 244/36 |
| 5,275,358 A | 1/1994 | Goldhammer et al. |
| 5,662,294 A * | 9/1997 | Maclean et al. ............ 244/219 |
| 5,738,298 A * | 4/1998 | Ross et al. .................. 244/1 N |
| 6,134,485 A * | 10/2000 | Tanielian et al. ............. 701/14 |

\* cited by examiner

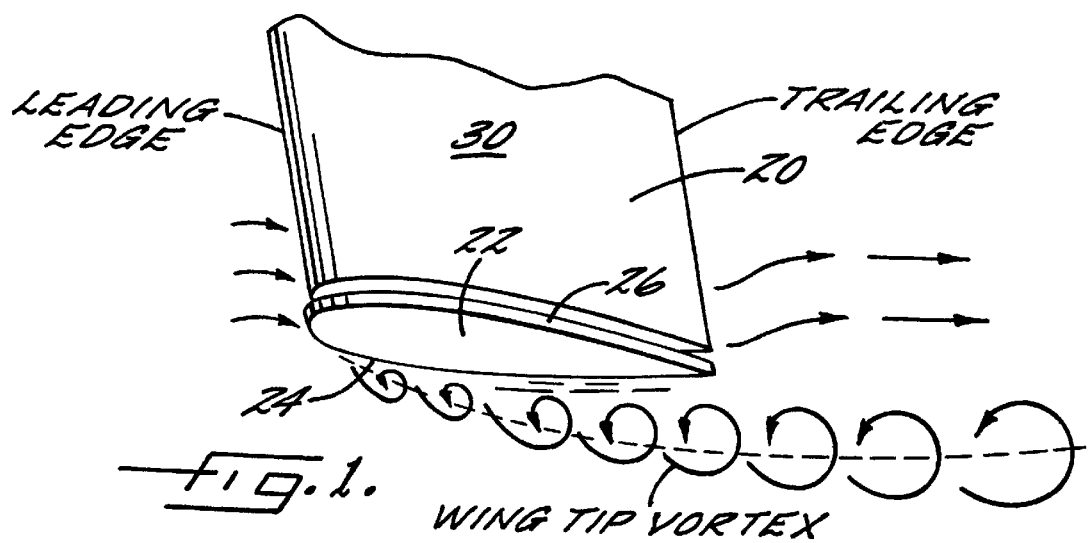
Fig. 1.
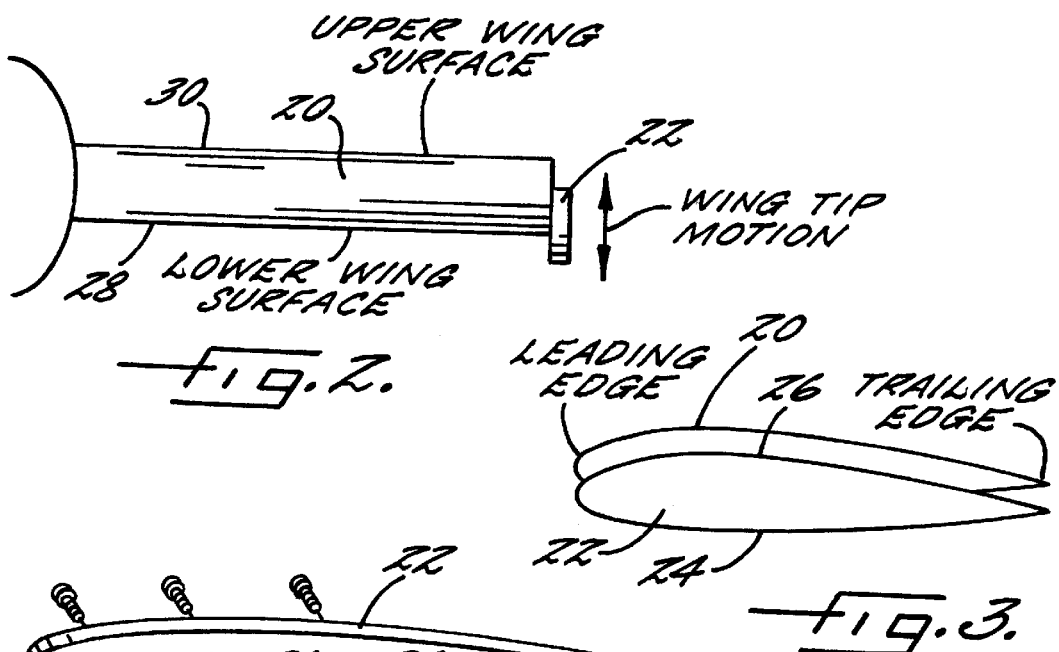
Fig. 2.
Fig. 3.
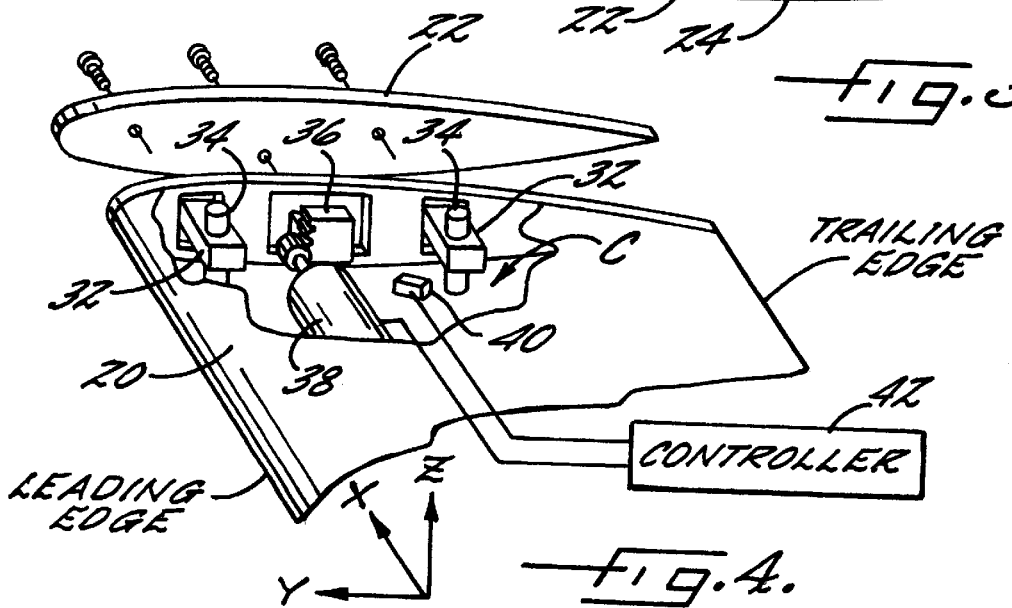
Fig. 4.

LIFTING SURFACE WITH ACTIVE VARIABLE TIP MEMBER AND METHOD FOR INFLUENCING LIFTING SURFACE BEHAVIOR THEREWITH

FIELD OF THE INVENTION

The present invention relates to lifting surfaces such as fixed wings of airplanes and rotor blades for helicopters and other rotorcraft. The invention relates more particularly to a device and method for influencing behavior of the lifting surface using a variable-geometry tip member.

BACKGROUND OF THE INVENTION

The phenomenon of the tip vortex generated at the free tip end of an aerodynamic lifting surface such as a wing or rotor blade has been the subject of much study. The tip vortex results from spanwise components of flow at the tip end induced by the pressure differential between the suction-side and pressure-side surfaces of the lifting surface. Thus, on the pressure-side surface at the tip end there is an outward spanwise component of flow that tends to cause the flow to roll over the tip end of the lifting surface toward the suction-side surface. As a result, the flow trailing from the tip end of the lifting surface tends to "roll up" in a vortex. Various undesirable effects accompany the tip vortex. For instance, the tip vortex can negatively impact other bodies behind the lifting surface, such as aircraft following another aircraft from which the tip vortex trails. Additionally, for some operating conditions in a rotor of a helicopter, such as during hover, a rotor blade will encounter a tip vortex generated by a preceding rotor blade. The blade-vortex interaction (BVI) that results is a source of noise and vibration. The tip vortex also causes an induced drag that reduces the aerodynamic efficiency of the lifting surface.

The lift at the outboard end of a wing or rotor blade must reduce to zero at the very tip. This phenomenon results in a reduction in the overall lift that otherwise could be achieved.

Accordingly, considerable effort has been devoted in the aeronautical community to reduce the negative effects associated with the local tip effects of lifting surfaces. One approach for fixed wings has been to attach a "winglet" to the tip of a wing. The winglet extends generally normal to the spanwise direction of the wing, either projecting above the suction surface or below the pressure surface. The winglet allows the very tip end of the wing to support a pressure differential such that the lift does not fall to zero. Thus, a winglet effectively extends the span of the wing without actually increasing the span. While the winglet is beneficial in terms of improving the maximum lift coefficient of the wing, this function is needed only during takeoff and landing, since the lift coefficient during cruise is much lower than during takeoff and landing. During cruise, the winglet actually degrades performance because of the increased drag associated with the winglet, and also hurts the maneuverability of the aircraft. Another drawback of the conventional winglet design is that it cannot be applied to rotor blades because the centrifugal forces exerted on the winglet would be too large to be supported by the winglet structure.

Various approaches have been proposed for reducing BVI noise and vibration. One approach is the Ogee tip design used in some helicopter rotor blades. The Ogee design allows the spanwise flow from the pressure-side surface of the blade to roll up in a bigger spanwise region of the blade, thereby attempting to spread the tip vortex out over a larger area and thus reduce its peak strength. As with the winglet, however, the Ogee tip is a passive design that is present at all times, even though it's beneficial effects may only be needed at certain selected flight conditions, and it can degrade performance at other flight conditions.

Active control devices have been proposed for helicopter rotor blade tips for various purposes. One technique is tip air injection, in which a high-energy jet of air is injected from the blade tip toward the center of the core of the tip vortex in an attempt to weaken the strength of the vortex. Although it can be effective, the system is complicated and heavy, and can degrade the aerodynamic performance to a greater extent than the benefit afforded by the system.

Another active tip device that has been proposed for reducing rotor blade vibration comprises a variable-pitch tip, known as a Smart Active Blade Tip (SABT), that pivots about a spanwise axis, driven by a piezoelectric-induced bending-torsion coupled beam that runs down the length of the blade. The pitching blade tip is intended to create unsteady air loads and, when correctly phased relative to the rotor blade rotation, these unsteady air loads ostensibly can cancel or at least reduce the original unsteady blade loads that contribute to vibration. Although this system may reduce vibration, it does not address blade noise.

Yet another active tip device, proposed for reducing rotor blade noise, comprises a device that droops from the leading edge and is driven by a piezoelectric stack actuator. The objective of this device is to be able to use thinner airfoil sections near the tip of the rotor blade without inducing flow separation on the retreating side of the blade. The device is reported to reduce thickness noise and HSI noise by significant amounts without compromising other aspects of the rotor design. However, the device does not address blade vibration.

SUMMARY OF THE INVENTION

The present invention provides an active tip device for a rotor blade that affects the aerodynamics at the blade tip so as to beneficially impact both blade noise and vibration. The device is also useful on fixed lifting members such as wings. Although the device can have a very small spanwise extent as a percent of blade or wing span, model test results suggest that the device can significantly increase maximum lift coefficient while reducing drag coefficient at high angles of attack. An advantage of the device is that if its function is not needed for certain operating conditions, the device can be positioned such that it forms a substantially continuous extension of the outboard end of the lifting member on which it is mounted, thus having minimal impact on the aerodynamics at the tip.

In accordance with one aspect of the invention, a tip member is movably mounted at the outboard end of the main lifting member. The main lifting member at least at the outboard end has an internal cavity defined therein between pressure-side and suction-side surfaces of the main lifting member. The tip member is movable relative to the main lifting member between a neutral position in which the tip member presents substantially no obstacle to a spanwise component of flow over either suction-side or pressure-side surfaces at the outboard end of the main lifting member, and a position in which a portion of the tip member extends beyond one of the pressure-side and suction-side surfaces of the main lifting member so as to present an obstacle to the spanwise component of flow over said surface at the outboard end of the main lifting member and thereby locally affect the flow at the outboard end. An actuation system for the tip member is disposed in the cavity of the main lifting member and coupled with the tip member for moving the tip member so as to vary a distance by which the tip member extends beyond said surface of the main lifting member.

In one embodiment of the invention, the tip member is slidably connected to the main lifting member so as to be slidable back and forth along a direction generally corresponding to a lift direction of the main lifting member. The tip member preferably is configured as a spanwise section of the main lifting member such that when the tip member is in the neutral position there is a substantially continuous and stepless transition between a pressure-side surface of the tip member and the pressure-side surface of the main lifting member and between a suction-side surface of the tip member and the suction-side surface of the main lifting member. When moved out of the neutral position, the tip member creates an inboard-facing step on one surface and an outboard-facing step on the other surface of the main lifting device.

The tip member preferably is affixed to guidance members that extend in an inboard direction from the tip member into the cavity and slidably connect to support members in the cavity affixed to the main lifting member. The guidance members and support members cooperate to substantially constrain movement of the tip member to a translation generally along the lift direction of the main lifting member.

In another embodiment of the invention, the tip member is pivotally connected to the main lifting member so as to pivot about an axis that extends generally in a chord direction of the main lifting member, i.e., in a direction from leading-edge to trailing-edge. The tip member is thus unlike a variable-pitch tip or a variable flap device, each of which pivots about a spanwise axis. The tip member preferably is affixed to guidance members that extend in an inboard direction from the tip member into the cavity and pivotally connect to support members in the cavity affixed to the main lifting member, the guidance members and support members cooperating to substantially constrain movement of the tip member to a rotation about the pivot axis.

Either the sliding or pivoting tip member can be used on a rotor blade for a helicopter or the like, and can be cyclically moved for achieving various effects on the aircraft. To this end, the actuation system in one embodiment includes an actuator for moving the tip member, a sensor mounted in the aircraft for sensing a condition associated therewith, and a controller coupled with the sensor and with the actuator so as to form a real-time adaptive control system for influencing the condition associated with the aircraft. For example, the sensor can be operable to sense a vibration of the aircraft and the controller can be operable to adaptively control movement of the tip member so as to suppress a level of the vibration sensed by the sensor. More particularly, the controller and actuator are operable to cyclically move the tip member with a frequency and amplitude controlled by the controller. An analysis can be performed on the measured vibration so as to derive a plurality of harmonic components of the vibration, and the tip member movement can be controlled so as to reduce at least one dominant harmonic component.

Alternatively, the sensor can measure noise and the controller and actuator can control movement of the tip member to suppress the noise. An analysis can be performed on the measured noise to deduce harmonic components of the overall noise, and the tip member can be moved in a fashion to reduce one or more components of the noise.

It is also possible on rotor blades or fixed wings to control position of the tip member to influence lift of the lifting member. The tip member can either be placed in a stationary position, or its position can be cyclically varied. Furthermore, on a wing the tip member can be cyclically moved so as to impart vibration to the wing and thereby influence behavior of the boundary layer on the wing.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a perspective view of a main lifting member having a sliding tip member in accordance with one embodiment of the invention;

FIG. 2 is a front view of the main lifting member of FIG. 1;

FIG. 3 is an end view of the main lifting member of FIG. 1;

FIG. 4 is an exploded perspective view of the main lifting member of FIG. 1, partially cut away to show details of the mounting and actuation system for the sliding tip member;

DETAILED DESCRIPTION OF THE INVENTION

Figure 5:
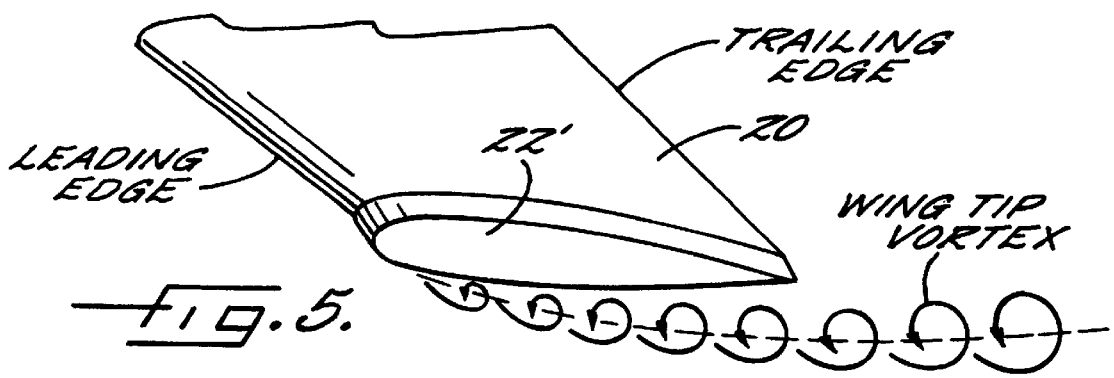
FIG. 5 is a perspective view of a main lifting member having a pivoting tip member in accordance with another embodiment of the invention.
Figure 6:
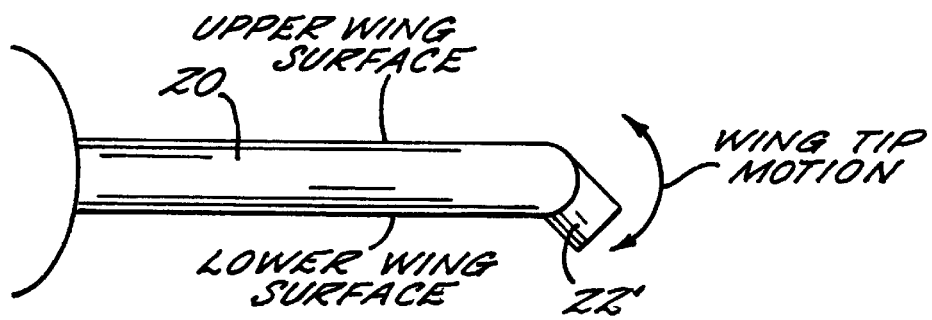
FIG. 6 is a front view of the main lifting member of FIG. 5.
Figure 7:
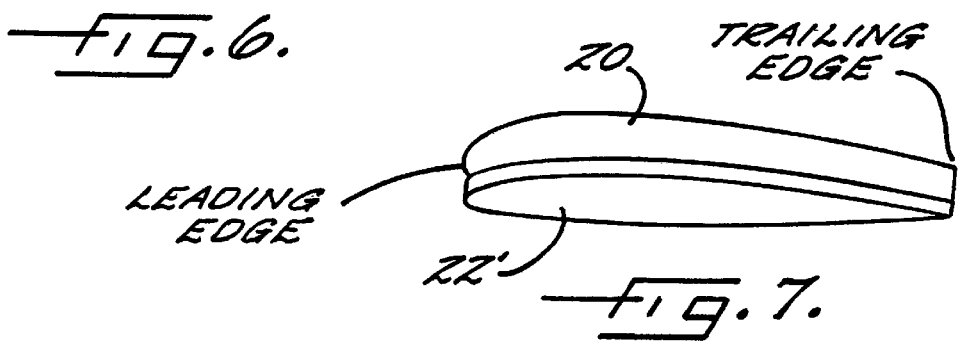
FIG. 7 is an end view of the main lifting member of FIG. 5.
Figure 8:
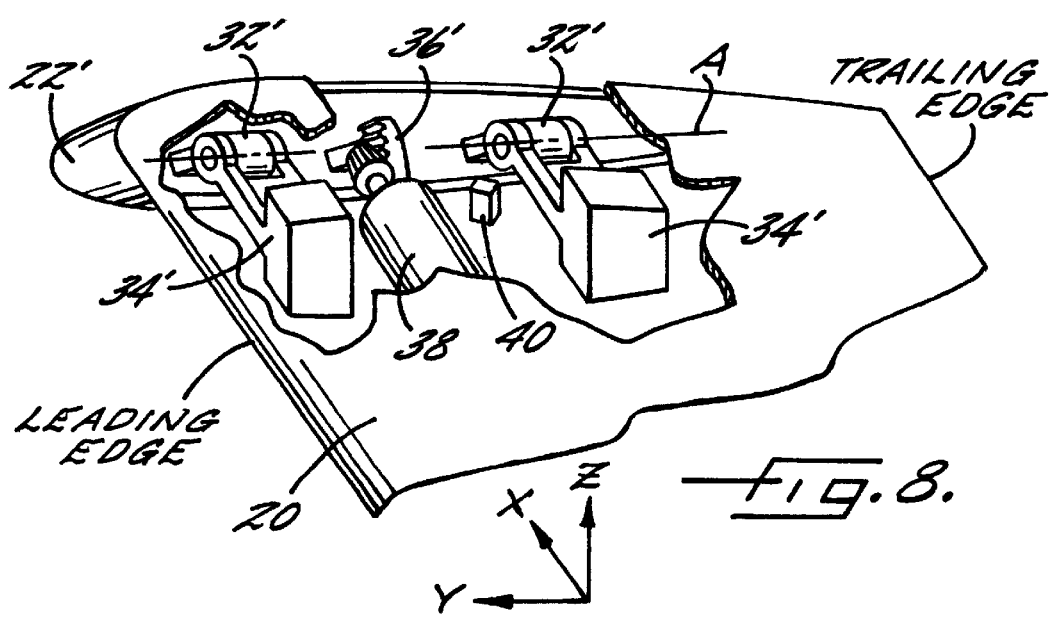
FIG. 8 is an exploded perspective view of the main lifting member of FIG. 5, partially cut away to show details of the mounting and actuation system for the pivoting tip member.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1 through 4 illustrate a first exemplary embodiment of the invention. A main lifting member 20 has a sliding tip member 22 mounted at an outboard or tip end of the main lifting member. Preferably, the tip member 22 is configured as a small spanwise section of the main lifting member 20 at the outboard end thereof, i.e., having essentially the same airfoil cross section as the main lifting member. The tip member 22 is movably mounted to the main lifting member so as to be slidable up and down along a direction generally corresponding to the lift direction of the main lifting member. The tip member 22 has a range of movement in this lift direction, which range includes a "neutral" position in which the tip member 22 at its pressure-side surface 24 and suction-side surface 26 forms a substantially continuous and stepless juncture with the corresponding pressure-side surface 28 and suction-side surface 30 of the main lifting member 20. In this neutral position (not shown in the Figures), the tip member 22 presents substantially no obstacle to the spanwise component of flow that tends to flow along the pressure-side surface 28 of the main lifting member and up around the tip of the main lifting member toward the suction-side surface 30.

However, in an extended position of the tip member 22, such as shown in FIGS. 1–3, the tip member 22 extends beyond one of the surfaces 28, 30 of the main lifting member so as to present an obstacle to the spanwise flow component over that surface. Thus, in FIGS. 1–3, the tip member 22 is shown extended beyond the pressure-side surface 28 of the main lifting member. Alternatively, the tip member 22 could be extended in the opposite direction beyond the suction-side surface 30 of the main lifting member. The range of movement of the tip member 22 can be such that the tip member can be extended in either direction from the neutral position, or the range can be limited to only one direction of movement from the neutral position, as desired. Currently, it is thought that it is advantageous to extend the tip member beyond the pressure-side surface of the main lifting member.

FIG. 4 is a schematic depiction of a mounting arrangement and actuation system for the tip member 22. The main lifting member 20 includes an internal cavity C at least at its outboard end. The tip member 22 is affixed to a pair of guidance members 32 that extend in an inboard direction from the tip member into the cavity C and slidably connect to support members 34 in the cavity affixed to the main lifting member. The guidance members 32 and support members 34 cooperate to substantially constrain movement of the tip member 22 to a translation generally along the lift direction of the main lifting member.

The tip member 22 is also affixed to a motion beam 36 that extends inwardly into the cavity C and is in driving connection with an actuator 38. The actuator 38 drives the motion beam 36 up and down along the lift direction of the main lifting member, thereby driving the tip member 22 up and down. The actuation and control system for the tip member includes at least one sensor 40, such as a Hall effect sensor, and a controller 42 connected to the actuator 38 and sensor 40. The controller 42 controls operation of the actuator 38 so as to move the tip member 22 to achieve a desired objective, in concert with the sensor 40 which is used for detecting a condition associated with the tip member 22, the main lifting member 20, or the aircraft on which the main lifting member is employed. As one example, the sensor 40 can be used for detecting a relative position of the tip member 22, and the controller 42 can be operable to conduct a closed-loop control of the position of the tip member 22 based on a value for the desired position of the tip member.

Alternatively, the sensor 40 can be used for detecting a condition associated with the aircraft, such as a vibration at some location on the aircraft. In this case, the controller 42 in concert with the sensor 40 can form a real-time adaptive control system for suppressing the level of vibration at the sensor location. This type of control system, which is well-known in the art and hence not described in detail herein, essentially learns how to control the controlled parameter so as to achieve a desired objective, such as minimizing a vibration level. For example, where the main lifting member 20 comprises a rotor blade for a helicopter, the sensor 40 can detect a vibration in the cockpit, and the controller 42 can be operable along with the actuator 38 to cyclically move the tip member 22 at a frequency and amplitude either or both of which are controlled by the controller so as to minimize the vibration at the sensor location. Alternatively, the sensor 40 can measure a noise level generated by the helicopter rotor and the controller and actuator can move the tip member at a frequency and amplitude for suppressing the noise.

It is also possible to control the tip member movement based on a predetermined schedule defining at least one of a frequency and an amplitude of the tip member movement as a function of an operating condition of the helicopter rotor. The tip member movement is changed in accordance with the schedule as the operating condition of the rotor changes.

Although the actuator 38 is schematically illustrated as a motor, it will be understood that various types of devices can be used for providing the motive force to move the tip member 22. Examples of suitable devices include piezoelectric actuators, actuators based on shape memory alloy (SMA) materials, and linear magnetic actuators.

Where the main lifting member 20 is a rotor blade, the cyclic movement of the tip member 22 generally will involve moving the tip member through at least one cycle for each revolution of the rotor blade. Where the objective is to minimize a vibration or noise, an analysis can be performed on the measured vibration or noise signal to break the measured signal down into harmonic frequency components, and the tip member movement can be controlled with an objective of suppressing one or more dominant components. Typically, the dominant components will be at frequencies comprising integral numbers of cycles per revolution of the rotor blade. The tip member can be moved at a frequency that is an integral number of cycles per revolution.

FIGS. 5 through 8 depict a second embodiment of the invention generally similar to the first embodiment, except that the tip member 22' pivots rather than sliding. The tip member 22' is mounted so as to pivot about a pivot axis A that extends in a chord direction of the main lifting member 20. To this end, the tip member is affixed to a pair of guidance members 32' that extend inwardly into the cavity in the main lifting member and are pivotally connected to a pair of support members 34' affixed to the main lifting member. The guidance members 32' and support members 34' constrain the motion of the tip member to a rotation about the pivot axis A. The tip member is also affixed to a motion beam 36' that is in driving connection with an actuator 38 for varying the position of the tip member.

The tip member 22' preferably can be placed in a neutral position in which the tip member forms a substantially continuous extension of the main lifting member 20 with no angle therebetween, and can be moved either in one direction from the neutral position, or in opposite directions from the neutral position.

Figure 9:
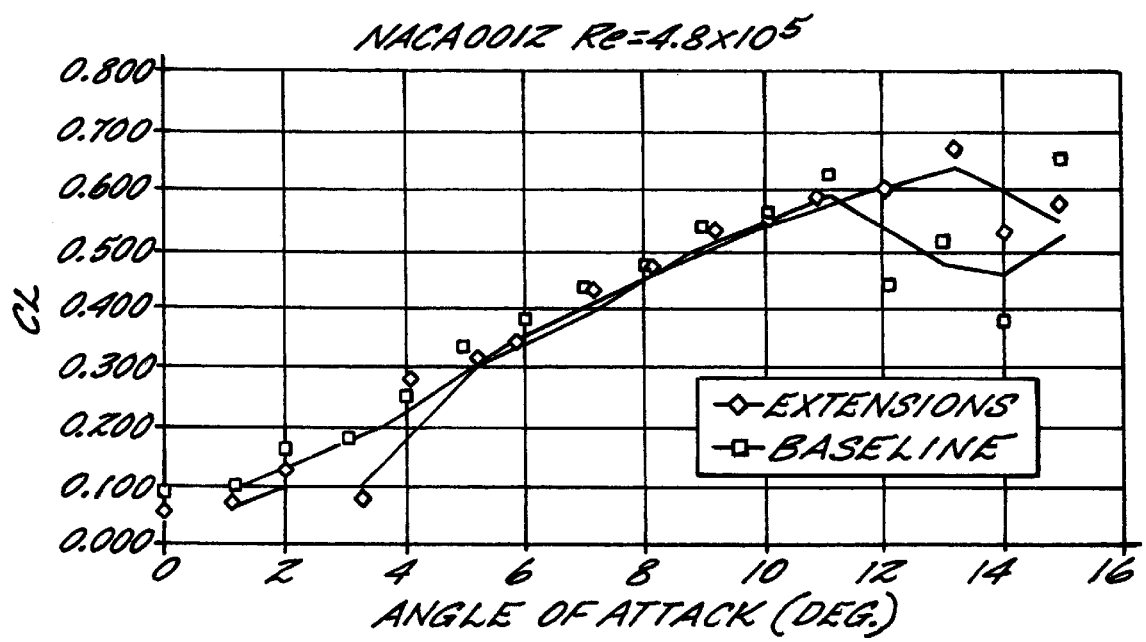
FIG. 9 is a plot of model test data obtained from a model test of the sliding tip member, showing low-speed lift coefficient versus angle of attack for a fixed wing both with and without the tip member.
Figure 10:
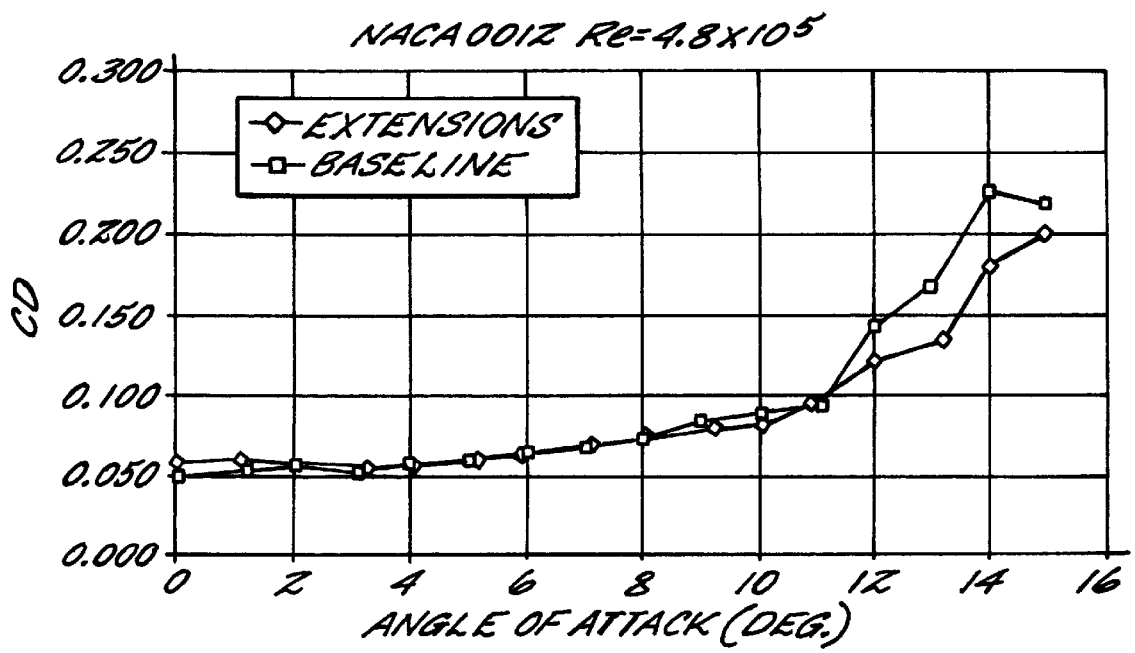
FIG. 10 is a plot of model test data showing drag coefficient versus angle of attack for the wing with and without the sliding tip member.

A scale model test of a wing with a sliding tip member substantially as shown in FIGS. 1–4 was tested in a low-speed wind tunnel. The wing comprised a NACA 0012 airfoil section, with a 22-inch span and a chord of 5.75 inches. The tip member had a spanwise length of ⅛-inch and had an airfoil cross section matching that of the wing. The tip member was placed in an extended position in which the pressure-side surface of the tip member extended 5/16-inch beyond the pressure-side surface of the wing. The wing was tested over a range of angle of attack and lift and drag were measured and converted to lift and drag coefficient data. A baseline test was also conducted for the wing without the tip member. Test data for the wing with tip member and the baseline wing are shown in FIGS. 9 and 10. It will be noted that at angles of attack above 11 degrees, the wing with extended tip member has a higher lift coefficient and yet has a lower drag coefficient than the baseline wing. This result is surprising in that conventional winglets typically provide a higher lift coefficient, but at the expense of higher drag as well.

It is also believed that the tip member in accordance with the invention can be used for deflecting the tip vortex core that trails from the tip of a wing or rotor blade. This deflection can be used to advantage in various ways. For instance, in a helicopter rotor, rather than moving the entire rotor blade to avoid the tip vortex from a preceding blade, the tip vortex core can be deflected so as to have less impact on a following blade. It is further believed that the tip member may have a weakening or diffusing effect on the tip vortex, which is also generally beneficial.

Advantages of the present invention over prior tip devices include an ability to place the tip member in a neutral position when its function is not needed. The tip member also does not require any compromise on the design of the main lifting member. The designer can design the wing or rotor blade airfoil section to optimize its aerodynamic performance, essentially without regard to the tip member. In flight conditions requiring the tip member to be active, there is no large moving piece creating large moments to contend with; indeed, the tip member can be quite small in spanwise extent, since the mechanism chiefly responsible for its effect is thought to be the retardation or discouragement of the spanwise flow component on the wing or rotor blade.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An aerodynamic lifting device comprising:
   a main lifting member having a span extending along a longitudinal axis from an inboard end to an outboard end thereof and having an airfoil-shaped cross-section normal to the longitudinal axis, the main lifting member at least at the outboard end having an internal cavity defined therein between pressure-side and suction-side surfaces of the main lifting member;
   a tip member movably connected at the outboard end of the main lifting member, the tip member being movable relative to the main lifting member between a neutral position in which the tip member presents substantially no obstacle to a spanwise component of flow over either suction-side or pressure-side surfaces at the outboard end of the main lifting member, and a position in which a portion of the tip member extends beyond one of the pressure-side and suction-side surfaces of the main lifting member so as to present an obstacle to the spanwise component of flow over said one surface at the outboard end of the main lifting member and thereby locally affect the flow at the outboard end, wherein the tip member is configured as a spanwise section of the main lifting member such that when the tip member is in the neutral position there is a substantially continuous and stepless transition between a pressure-side surface of the tip member and the pressure-side surface of the main lifting member and between a suction-side surface of the tip member and the suction-side surface of the main lifting member, the tip member when moved out of the neutral position creating an inboard-facing step on said one surface and an outboard-facing step on the other surface of the main lifting device; and
   an actuation system disposed in the cavity of the main lifting member and coupled with the tip member, the actuation system being operable to move the tip member so as to vary a distance by which the tip member extends beyond said one surface of the main lifting member.

2. The lifting device of claim 1, wherein the tip member is affixed to guidance members that extend in an inboard direction from the tip member into the cavity and slidably connect to support members in the cavity affixed to the main lifting member, the guidance members and support members cooperating to substantially constrain movement of the tip member to a translation generally along the lift direction of the main lifting member.

3. The lifting device of claim 1, wherein the actuation system includes an actuator for moving the tip member, a sensor for detecting a position of the tip member, and a controller coupled with the sensor and the actuator so as to form a closed-loop control system in which the controller is operable to cause the tip member to be positioned in any selected position.

4. The lifting device of claim 1, wherein the actuation system includes a piezoelectric actuator.

5. The lifting device of claim 1, wherein the actuation system includes a shape memory alloy element for providing motive force.

6. The lifting device of claim 1, wherein the actuation system includes a magnetic linear actuator.

7. An aerodynamic lifting device comprising:
   a main lifting member having a span extending along a longitudinal axis from an inboard end to an outboard end thereof and having an airfoil-shaped cross-section normal to the longitudinal axis, the main lifting member at least at the outboard end having an internal cavity defined therein between pressure-side and suction-side surfaces of the main lifting member;
   a tip member movably connected at the outboard end of the main lifting member, the tip member being movable relative to the main lifting member between a neutral position in which the tip member presents substantially no obstacle to a spanwise component of flow over either suction-side or pressure-side surfaces at the outboard end of the main lifting member, and a position in which a portion of the tip member extends beyond one of the pressure-side and suction-side surfaces of the main lifting member so as to present an obstacle to the spanwise component of flow over said surface at the outboard end of the main lifting member and thereby locally affect the flow at the outboard end; and
   an actuation system disposed in the cavity of the main lifting member and coupled with the tip member, the actuation system being operable to move the tip member so as to vary a distance by which the tip member extends beyond said surface of the main lifting member, wherein the main lifting member forms part of an aircraft, and wherein the actuation system includes an actuator for moving the tip member, a sensor mounted in the aircraft for sensing a condition associated therewith, and a controller coupled with the sensor and with the actuator so as to form a real-time adaptive control system for influencing the condition associated with the aircraft.

8. The lifting device of claim 7, wherein the main lifting member comprises a rotor blade for a rotorcraft, and wherein the sensor is operable to sense a vibration of the rotorcraft and the controller is operable to adaptively control movement of the tip member so as to suppress a level of the vibration sensed by the sensor.

9. The lifting device of claim 8, wherein the controller and actuator are operable to cyclically move the tip member with a frequency and amplitude controlled by the controller.

10. A method for influencing behavior of a lifting member, comprising:
providing a main lifting member having a span extending along a longitudinal axis from an inboard end to an outboard end thereof and having an airfoil-shaped cross-section normal to the longitudinal axis;
providing a tip member movably connected to the outboard end of the main lifting member, the tip member being movable relative to the main lifting member between a neutral position in which the tip member presents substantially no obstacle to a spanwise component of flow over either suction-side or pressure-side surfaces at the outboard end of the main lifting member, and a position in which a portion of the tip member extends beyond one of the pressure-side and suction-side surfaces of the main lifting member so as to present an obstacle to the spanwise component of flow over said surface at the outboard end of the main lifting member and thereby locally affect the flow at the outboard end; and
cyclically moving the tip member relative to the main lifting member so as to cyclically vary an amount by which the tip member extends beyond said surface of the main lifting member.

11. The method of claim 10, wherein the main lifting member comprises a helicopter rotor blade rotating about an axis, and wherein the tip member is moved through at least one cycle per revolution of the rotor blade.

12. The method of claim 11, wherein the tip member is moved with a cyclic frequency that is an integral number of cycles per revolution of the rotor blade.

13. The method of claim 11, further comprising reducing vibration by moving the tip member at a frequency and an amplitude selected so as to reduce vibration.

14. The method of claim 13, further comprising measuring vibration of at least one of the helicopter and the rotor blade, and varying at least one of the frequency and the amplitude of the tip member movement so as to suppress the measured vibration.

15. The method of claim 14, further comprising performing an analysis on the measured vibration so as to derive a plurality of harmonic components of the vibration, and wherein the tip member movement is controlled so as to reduce at least one dominant harmonic component.

16. The method of claim 11, further comprising providing a predetermined schedule of tip member movement, the schedule defining at least one of a frequency and an amplitude of the tip member movement as a function of an operating condition of the helicopter rotor, and wherein the tip member movement is changed in accordance with the schedule as operating condition of the helicopter rotor changes.

17. The method of claim 11, further comprising reducing noise produced by the rotor blade by moving the tip member at a frequency and an amplitude selected so as to reduce noise.

18. The method of claim 17, further comprising measuring noise produced by the rotor blade, and varying at least one of the frequency and the amplitude of the tip member movement so as to drive the measured noise toward a lower level.

19. The method of claim 18, further comprising performing an analysis on the measured noise so as to derive a plurality of harmonic components of the noise, and wherein the tip member movement is controlled so as to reduce at least one dominant harmonic component of the noise.

20. The method of claim 11, further comprising increasing lift produced by the rotor blade by moving the tip member at a frequency and an amplitude selected so as to increase lift.

21. The method of claim 10, wherein the main lifting member comprises a fixed wing of an aircraft, and wherein the tip member is configured to generate sufficient aerodynamic forces and is moved at a frequency and amplitude selected so as to induce vibration of the wing for influencing behavior of a boundary layer on the wing.

22. The method of claim 10, wherein the tip member is cyclically translated relative to the main lifting member along a direction generally corresponding to a direction in which aerodynamic lift acts on the main lifting member.

23. The method of claim 10, wherein the tip member is cyclically pivoted relative to the main lifting member about a pivot axis that extends in a chord direction of the main lifting member.

24. The method of claim 10, further comprising measuring a condition associated with an aircraft on which the main lifting member is employed using a sensor, and using a real-time adaptive control system coupled with the sensor and with an actuator that moves the tip member, so as to adaptively control the tip member movement to influence the condition associated with the aircraft.

25. The method of claim 24, wherein the sensor is used to measure a vibration of the aircraft, and the control system is operable to control the movement of the tip member so as to suppress the vibration.

* * * * *